(12) United States Patent
Lubarsky (10) Patent No.: US 9,354,131 B2
(45) Date of Patent: May 31, 2016

(54) METHOD AND APPARATUS FOR MEASURING TORQUE TRANSMITTED BY DRIVEN WHEEL OF A CYCLE OR THE LIKE VEHICLE

(75) Inventor: Gennady Lubarsky, St. Andrews (GB)

(73) Assignee: LASER SPOKE LIMITED, Belfast (GB)

( * ) Notice: Subject to any disclaimer, the term of this patent is extended or adjusted under 35 U.S.C. 154(b) by 1109 days.

(21) Appl. No.: 13/260,559

(22) PCT Filed: Dec. 31, 2009

(86) PCT No.: PCT/GB2009/002980
§ 371 (c)(1),
(2), (4) Date: Sep. 26, 2011

(87) PCT Pub. No.: WO2010/084297
PCT Pub. Date: Jul. 29, 2010

(65) Prior Publication Data
US 2012/0022800 A1    Jan. 26, 2012

(30) Foreign Application Priority Data

Jan. 22, 2009   (GB) .................................. 0901036.4

(51) Int. Cl.
*G01L 3/14* (2006.01)
*G01L 3/24* (2006.01)

(52) U.S. Cl.
CPC .............. *G01L 3/1421* (2013.01); *G01L 3/242* (2013.01)

(58) Field of Classification Search
CPC ......... G01L 5/00; G01L 5/004; G01L 25/003; G01L 1/00
USPC ......................................................... 702/41
See application file for complete search history.

(56) References Cited

U.S. PATENT DOCUMENTS 4,811,612 A * 3/1989 Mercat ................... A61B 5/221
                                                    73/862.324
5,705,810 A * 1/1998 Wang et al. .............. 250/231.13
(Continued)

FOREIGN PATENT DOCUMENTS

DE        1148777 B      5/1963
DE     19847739 A1 *    4/2000
(Continued)

OTHER PUBLICATIONS

English Machine Translation of Patent: DE19847739, Tieffel P.*
Machine Translation of DE102008005807.*
English translation of Patent: DE 19847739 A1; Tieffel, P.

*Primary Examiner* — Gregory J Toatley
*Assistant Examiner* — Terence Stifter, Jr.
(74) *Attorney, Agent, or Firm* — Law Office of Jesse D. Lambert, LLC (57) ABSTRACT

There is provided an apparatus and method for measuring and monitoring the torque exerted by a cyclist during pedaling of a human-powered vehicle, as for example a bicycle, including an electromagnetic emitter which is adapted to be fixed securely to a rear wheel hub, for generating and directing a beam of electromagnetic radiation towards a rim of the wheel, and a detector mounted on the wheel for detecting the movement of the beam when torque is applied to the wheel, the movement being indicative of an angular displacement of the hub with respect to the rim and directly proportional to the torque. Either alone or using optical elements, the beam is directed to travel at least a distance between the emitter and the rim before detection. The measurement can be used to provide a power output.

13 Claims, 4 Drawing Sheets

(56) References Cited

U.S. PATENT DOCUMENTS

| | | | |
|---|---|---|---|
| 6,418,797 B1 * | 7/2002 | Ambrosina et al. | 73/862.29 |
| 6,450,393 B1 * | 9/2002 | Doumanidis et al. | 228/110.1 |
| 7,822,563 B2 * | 10/2010 | Matsuda et al. | 702/41 |
| 2004/0232318 A1 * | 11/2004 | Kitamura et al. | 250/221 |
| 2007/0068273 A1 * | 3/2007 | Cunningham | 73/781 |
| 2007/0170688 A1 | 7/2007 | Watson | |
| 2011/0035056 A1 * | 2/2011 | Richards | G01B 11/16 700/275 |

FOREIGN PATENT DOCUMENTS

| | | | |
|---|---|---|---|
| DE | 102008005807 | * | 7/2009 |
| JP | 62100629 A | * | 5/1987 |
| JP | 01 184430 A | | 7/1989 |
| JP | 07196071 A | | 8/1995 |
| WO | WO 96/10167 A1 | | 4/1996 |
| WO | WO 2010054661 A2 | * | 5/2010 |

* cited by examiner

METHOD AND APPARATUS FOR MEASURING TORQUE TRANSMITTED BY DRIVEN WHEEL OF A CYCLE OR THE LIKE VEHICLE

FIELD OF THE INVENTION

This invention generally relates to measurement of the torque transmitted by a driving wheel and in particular, though not exclusively, by the driving wheel of a cycle.

BACKGROUND OF THE INVENTION

Mechanical power produced by human powered transport is a parameter that reflects both the rider performance and the efficiency of the propulsion system. Monitoring of power output while cycling can help to maintain comfortable and sustainable pedaling over long periods of time. Knowledge of power produced by a rider is very important for people commuting by bike to their work or study and also for those performing fitness exercises. In modern training programmes power measurement is the ultimate tool routinely used by professional coaches to examine performance of elite-level cyclists.

In order to perform power monitoring the vehicle e.g. bicycle, should be equipped with a portable system able to acquire, to calculate and to display data throughout the riding process. After more than three decades of development, a wide range of devices for measuring dynamic parameters in bicycles have been proposed. These devices have been implemented more or less successfully to all moving parts of the bicycle propulsion system, starting from the crank through the chain to the spokes. Operating in various ways, these power meters utilise a similar physical principle: measuring the force applied to one of the moving elements of the power delivery system and the element velocity caused by this force. Force can be measured in power metering systems directly or indirectly—as a momentum produced by this force—a torque. To avoid any inaccuracy in the power measurements an ideal power meter should not be in contact with the propulsion system. In practice, the power converted to the vehicle motion is not equal to the power produced by the human body due to energy loss in transmission elements. In order to measure an actual power the measurement should be performed as close to the power output as possible. For example in bicycles the power output is at the point of contact between the rear wheel tyre and the ground. This property is also important for power meters used on tandems—vehicles driven by more than one cyclist.

Torque measurements are typically performed in the prior art using strain gauges fixed to the pedals, the crank and the chain wheel. International patent application, WO89/000401 to Schoberer (1989) discloses a power meter with deformation elements built in to the chain ring. The deformation is measured by strain gauges and the angular velocity is calculated by counting rotations of the crank. Acquired data is used to calculate the torque created on the crank. However, in order to install this power meter the existing chain ring needs to be removed. As it is produced from precise parts this power meter is expensive and not transferable from bike to bike. Another method to measure power on bicycles is proposed in U.S. Pat. No. 6,356,847 to Gerlitzski (2002). An optical sensor placed on the bottom bracket is used to measure the distance the pedal spindle twists and the angular velocity of the spindle is measured several times per crank revolution. This power meter requires the replacement of the bottom bracket with a specially designed bracket. Due to the specifics of construction the device can be used to measure the power input from the left leg only. A power meter based on the direct measurement of the force exerted in a drive chain is proposed in U.S. Pat. No. 6,356,848 to Cote et al. (2002). The system includes chain vibration and velocity sensors. The frequency of vibration is translated to the chain tension and used with the value of its velocity to calculate the power output. The accuracy of this method is very dependent on correct system installation, which is not straightforward and needs to be performed by skilled personnel. Another power meter based on direct force measurements is disclosed in U.S. patent application 2007/245835 to Hauschildt (2007). The device uses a flexible force sensor inserted in a cycling shoe to record the force applied by the cyclist to the pedal. This data is used in an approximate mathematical model of cycling to calculate an averaging power input from a cyclists' foot. This does not make a measurement of the propulsion system. A power metering system based on the monitoring of the rear wheel twisting is described in U.S. Pat. No. 4,811,612 to Mercat (1989). Angular divergence between the hub and the rim created by torque is detected using a disk and a hoop attached to the hub and the rim respectively. Openings formed in the disk and the hoop pass in front of photosensitive detectors. The signal produced by both detectors is used to compute the torque. The method essentially consists in measuring the angular displacement of a peripheral region of the wheel in relation to its central region. Since on a majority of bicycles this displacement is very small, the signal to noise ratio produced by this device is high. This fact makes the data acquisition process unstable and the method unreliable. To install this power meter to a bicycle requires the mounting of a large and specifically built hoop and disk. The installation must be done by a reasonably skilled mechanic with specific tools for the job. Furthermore, using a bike equipped with the perforated hoop may be hazardous for the rider and for other people around.

It is to the provision of an accurate, transferable, safe, simple and non-expensive device for monitoring torque transmitted by a driving wheel produced by a rider of a human powered vehicle that the present invention is primarily directed. A power meter using the torque measurement is also provided.

OBJECT OF THE INVENTION

The present invention seeks to overcome the problems associated with the prior art by providing a torque monitoring apparatus and, in an embodiment, to give an improved power meter which is universal and allows monitoring of power output produced by riders of different types of human-powered vehicles. Further objects, each being within at least one embodiment of the present invention, provide an improved power meter which is simple and inexpensive to use and manufacture; which is universal, transferable and can be mounted on most common types of bicycles and tandems; which is based on a contactless method; which is accurate and reliable; and which measures an actual power output.

Other and further objects and advantages will become apparent from a consideration of the following description and accompanying drawings hereinafter and are more fully delineated in the appended claims.

SUMMARY OF THE INVENTION

According to a first aspect of the present invention there is provided an apparatus for monitoring torque transmitted by a driving wheel of a human powered vehicle, said apparatus comprising an electromagnetic emitter which is adapted to be fixed securely to a central region of said wheel for generating and directing a beam of electromagnetic radiation towards a rim of said wheel, and a detector mounted on said wheel for detecting the movement of the beam when torque is applied to said wheel, said movement being indicative of an angular displacement of said central region with respect to said rim and directly proportional to the torque, and wherein said beam travels at least a distance between said emitter and said rim before detection. In this way, a more accurate measurement of the angular displacement i.e. the twist of the wheel and hence the torque applied, can be obtained as the beam will deviate further over a longer distance. The detector may be a one-dimensional optical position sensitive detector as is known in the art while the emitter may be a laser device, as is also known in the art.

Preferably, the apparatus further comprises a magnetic sensor which is adapted to count rotations of said wheel and thereby monitor angular velocity. Advantageously, the apparatus includes a microprocessor programmed to provide a power output based on the monitored parameters and calibration values. This may be stored and/or displayed for the rider and/or trainer.

In an embodiment, said emitter is fixed securely to a hub of said wheel and said detector is mounted on said rim. In this way a simple, transportable, unobtrusive and easily mountable apparatus is provided. Advantageously, a cylindrical lens may be located at an input of said detector to focus said beam onto said detector.

Preferably, said emitter generates a beam at intervals synchronised with the wheel rotation. In this way, the beam direction can be selected to increase the safety of the apparatus.

Optionally, the apparatus further comprises one or more optical elements to direct said beam towards said detector. In this way, the distance between the emitter and detector can be increased to further enhance the deviation of the beam and improve the signal to noise ratio. The optical element may comprise a retro-reflector mounted on said rim, to reflect said beam to said detector mounted on said central region. In this arrangement the distance is doubled. Alternatively, the optical elements may comprise a mirror and a prism, wherein said emitter and said detector are located on a stay of said vehicle, said mirror being secured to said hub and said prism being secured to said rim. By mounting the emitter and detector on the seat stay or the chain stay, all electrical components are attached to non-moving elements of the vehicle which allows simple components to be used thereby reducing the cost.

In an embodiment, the apparatus further comprises a tube, said tube being arranged between said emitter and said detector to substantially contain said beam. In this way the detector, emitter and beam path are not affected by mud or other debris as the vehicle is operated.

According to a second aspect of the present invention there is provided a method of monitoring torque transmitted by a driving wheel of a human powered vehicle, comprising measuring an angle of twist of said wheel when torque is applied and wherein said angle is measured by detecting the deflection of a beam produced by an emitter fixed to a central region of said wheel, said beam travelling at least a distance between said emitter and a rim of said wheel before detection.

Preferably, the method further comprises measuring a wheel torsion coefficient by fixing said rim in relation to said central region and applying a known torque to a sprocket of said wheel. Preferably also, the method further comprises measuring an angular velocity of said wheel and calculating a power output. In this way, a power output meter is realised.

BRIEF DESCRIPTION OF THE DRAWINGS

In order that the present invention can be more readily understood and be put into practical effect, reference will now be made to the accompanying drawings, wherein.

DETAILED DESCRIPTION OF THE INVENTION

Figure 1A:
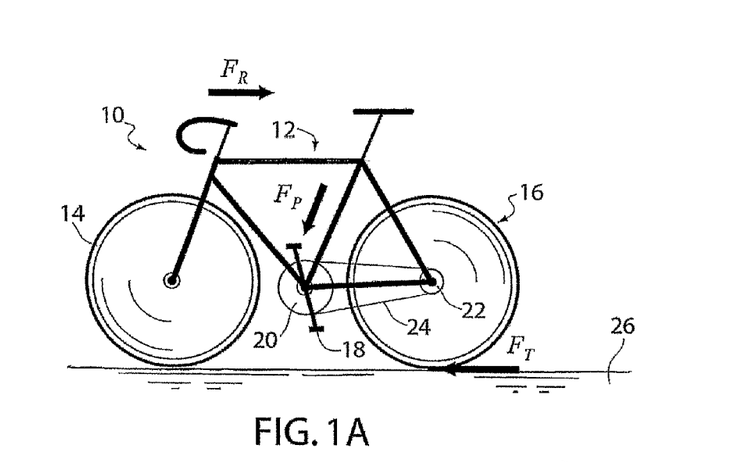
FIG. 1A is a side view of a typical bicycle with which the present invention is used and detailed with the main forces operating in a system.

Embodiments of the present invention will now be described. These embodiments are presented to aid in an understanding of the invention and are not intended to, and should not be construed to, limit the invention in any way. All alternatives, modifications and equivalents that may become obvious to those of ordinary skill upon a reading of the present disclosure are included within the spirit and scope of the invention. FIG. 1A illustrates a typical bicycle 10 which is well known in the art. The bicycle comprised a frame 12, a front wheel 14 and a rear wheel 16, pedals 18, a front sprocket 20 and a rear sprocket 22 connected with a chain 24.

As well known in the art, to propel bicycle 10, the rider applies force $F_P$ to pedals and produces the traction force $F_T$ in the contact between the rear wheel 16 and the ground 26 to overcome a sum of aerodynamic, inertia, resistance and gravitational forces operating along the longitudinal direction $F_R$. Force $F_P$ transmits, with finite efficiency, to the rear wheel through the bicycle propulsion system: from pedals, to the front sprocket, to the chain, and to the rear sprocket. Depending on the type of lubrication, vehicle age, gear ratio and cycling regime, the efficiency of typical bicycle transmissions may vary from 85 to 99% and may be as low as 75% in an old bike with rusty parts. Therefore, measuring power performed on the rear wheel is more accurate and provides information on the actual power output produced by the system.

Figure 1B:
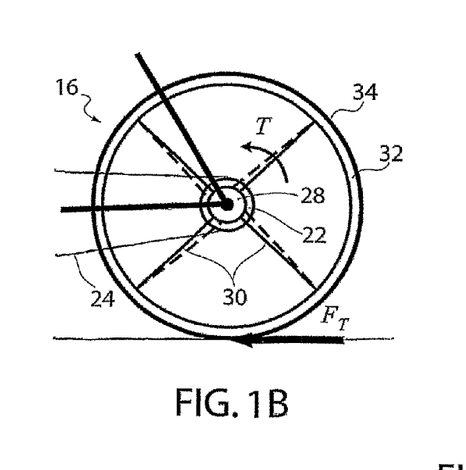
FIG. 1B is a side view of a rear wheel of the bicycle shown on FIG. 1A and detailed with the main forces operating in a system.
Figure 1C:
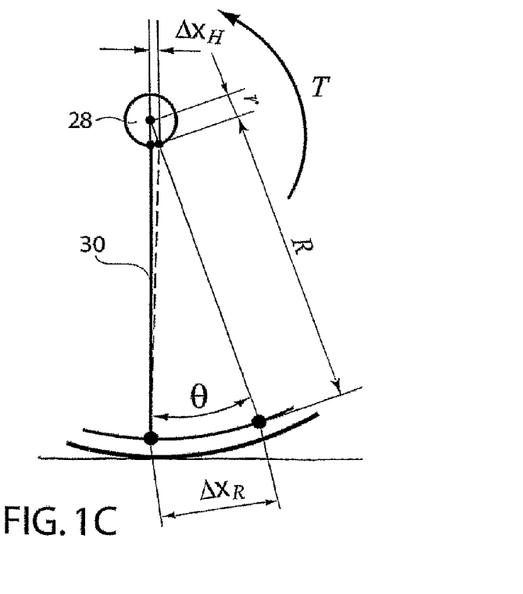
FIG. 1C is a fragmentary side view of the rear wheel shown on FIG. 1B and its deformation.

As shown in FIG. 1B the rear sprocket 22 is fixedly secured to the hub 28 of the rear wheel 16. Torque T created on the hub 28 transfers to the contact area between the rear wheel and ground 26 by the set of spokes 30, a rim 32 and a tyre 34. Having a certain level of flexibility, the rear wheel 16 operates as a torsion spring twisting proportionally to the applied torque. As deformations of the hub 28, the rim 32 and the tyre 34 are very small due to their construction and rigidity, the twisting mainly occurs in the spokes region (dashed lines on FIG. 1B). In more detail, this process is illustrated in FIG. 1C. The torque T applied to the hub 28 bends the spokes and causes angular displacement of the hub in relation to the rim. The angle of the twist θ can be expressed as:

$$\theta = \frac{T}{k} \qquad 1$$

where k is the torsion elastic modulus of the wheel, also known to those skilled in the art as coefficient of torsion or torsion coefficient. This coefficient is mainly dependant on the wheel construction, materials and the bicycle setup. The torsion modulus can be obtained experimentally for any wheel from a simple calibration procedure, which will be described later in this text. Depending on the applied torque and properties of wheel, the angle of the twist is usually between 0.1 and 1 degree. The angular displacement of the hub can be expressed as:

$$\Delta x_H = r \tan\theta = r \tan\frac{T}{k} \qquad 2$$

where r is a radius of the hub. On the majority of modern bicycles this dimension is about 15-20 mm. It is easy to assume that the angular displacement produced on the hub is very small and not of practical use as the signal-to-noise ratio produced in these measurements is high. However, if we consider this imaginary line projected to the rim (FIG. 1C) this produces a much greater shift due to the enlarged distance:

$$\Delta x_R = (r + R)\tan\theta = (r + R)\tan\frac{T}{k} \qquad 3$$

where R is a distance between the hub and the rim surfaces. This dimension varies for many bicycles from 250 to 300 mm making the shift $\Delta x_R$ big enough for practical measurements.

For rotating wheels, power can be derived as:

$$P = T\omega \qquad 4$$

where ω is the angular velocity of the wheel. Combining this equation with the expression for the shift $\Delta x_R$ yields the power output of the wheel:

$$P = \omega k \tan^{-1}\frac{\Delta x_R}{x + R} \qquad 5$$

Thus, it is seen that for a wheel with known geometry, the power output can be calculated from measurements of the shift $\Delta x_R$ and the angular velocity.

Figure 2A:
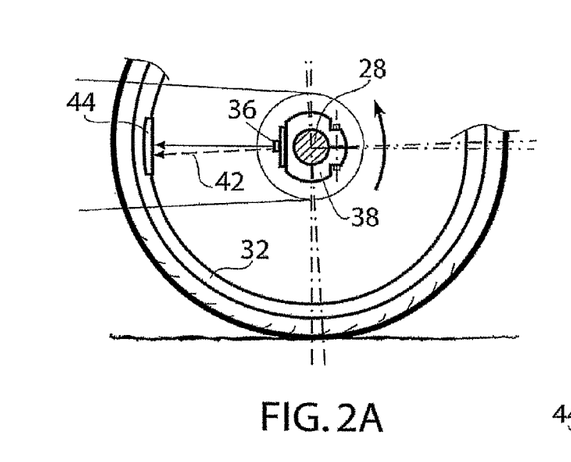
FIG. 2A is a side view of a rear wheel and apparatus according to an embodiment of the present invention, illustrating an optical displacement system mounted to the hub and the rim.
Figure 2B:
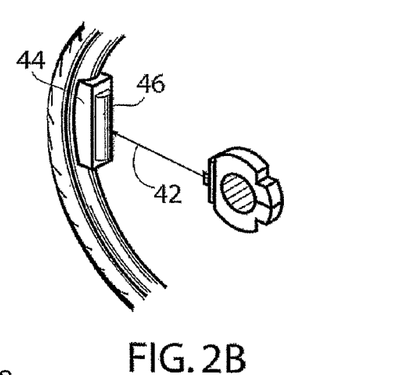
FIG. 2B is a perspective view of the rear wheel shown on FIG. 2A.

One embodiment of the power meter is illustrated in FIG. 2A. A laser module 36 is fixedly secured by a bracket 38 to the rear wheel hub 28 and a one-dimensional optical position sensitive detector 44 is fixedly attached to the rim 32. In operation, a substantially coherent and substantially parallel beam 42 is continuously projected from the laser and forms a light spot on the detector surface. The detector 44, in turn, produces an electrical signal, which is proportional to the position of the light spot, the beam deflection (dashed line on the figure) and the applied torque. If the wheel is not loaded, the signal is equal to zero or has a minimal value. To improve the laser beam 42 focusing on the optical detector and to provide additional protection to the window of detector, the detector window can be covered with a cylindrical lens 46 as illustrated on FIG. 2B. The signal generated by the detector can be transmitted wirelessly to a computation unit (not shown) and, in a processor, the signal is used together with the wheel angular velocity to calculate the power output. The angular velocity can be detected directly from the counting of rotation of the wheel by one of well known in prior art magnetic sensors, such as a reed switch, Hall effect sensor or a magneto-resistive sensor. The power output together with the torque, if desired, can be stored in the computational unit and/or displayed to the rider and/or a trainer by a radio transceiver.

The power can be calculated using equation 5 if the wheel geometry is well defined and the wheel torsion coefficient is known. This coefficient can be obtained from the wheel calibration. With the power meter installed on the wheel the calibration process is easy. To perform calibration, one fixes the rim 32 of the wheel 16 and applies known torque $T_k$ to the hub measuring the laser beam deflection $\Delta x_k$ corresponding to this torque. Then, the coefficient of torsion calculated as:

$$k = T_k / \tan^{-1}\frac{\Delta x_k}{r + R} \qquad 6$$

Practically, the rim 32 can be fixed using a braking mechanism installed on the bike or by hand and the torque can be applied with a chain whip—a common tool in any workshop, to apply calibrating torque to the rear sprocket.

Figure 3:
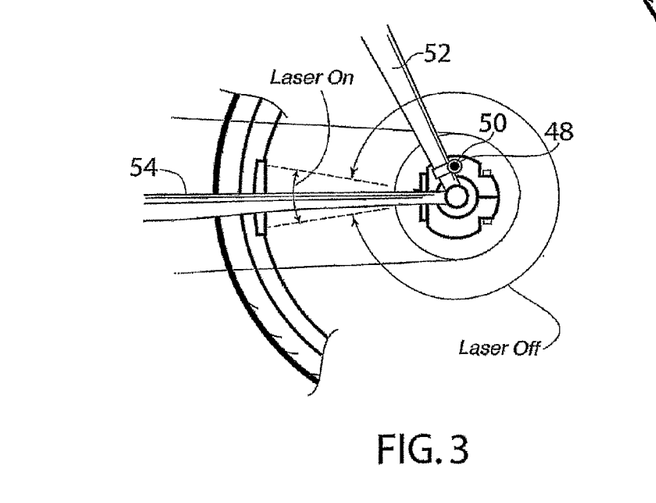
FIG. 3 is a side view of a rear wheel and apparatus according to an embodiment of the present invention, illustrating operation with an optical displacement system and a magnetic switch mounted to the seat stay.
Figure 4:
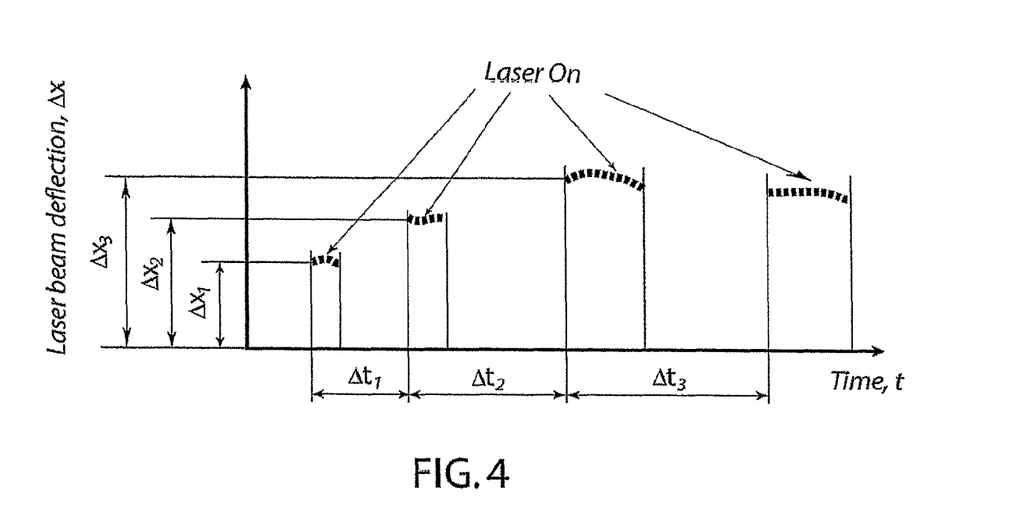
FIG. 4 is a graphical representation of a typical profile of a measured signal.

In an alternative embodiment, depicted in FIG. 3, the laser operates non-continuously, at regular intervals synchronised with the wheel rotation. The laser is controlled by a magnetic switch 48 attached to the hub and a magnet fixed on a seat stay 52 or a chain stay 54. In this configuration, the position of a narrow circular segment with the laser in operation can be adjusted to any chosen direction in order to increase the safety level of the laser based power meter. FIG. 4 shows a graphical representation of a signal produced by the position sensitive detector during pedaling. The laser beam deflection $\Delta x_i$ is measured as a function for any rotation of the wheel. The length of periods $\Delta t_i$ depends on the angular velocity of the wheel. For any cycle this velocity can be calculated as:

$$\omega_i = \frac{2\pi}{\Delta t_i} \qquad 7$$

Combining this expression with equation 5, the power produced on the wheel can be calculated by the averaging of data collected over any number of rotations n using formula:

$$P_n = 2\pi k \sum_{i=0}^{n} \frac{1}{\Delta t_i} \tan^{-1} \frac{\Delta x_i}{r+R} \qquad 8$$

Figures 5, 6, 7:
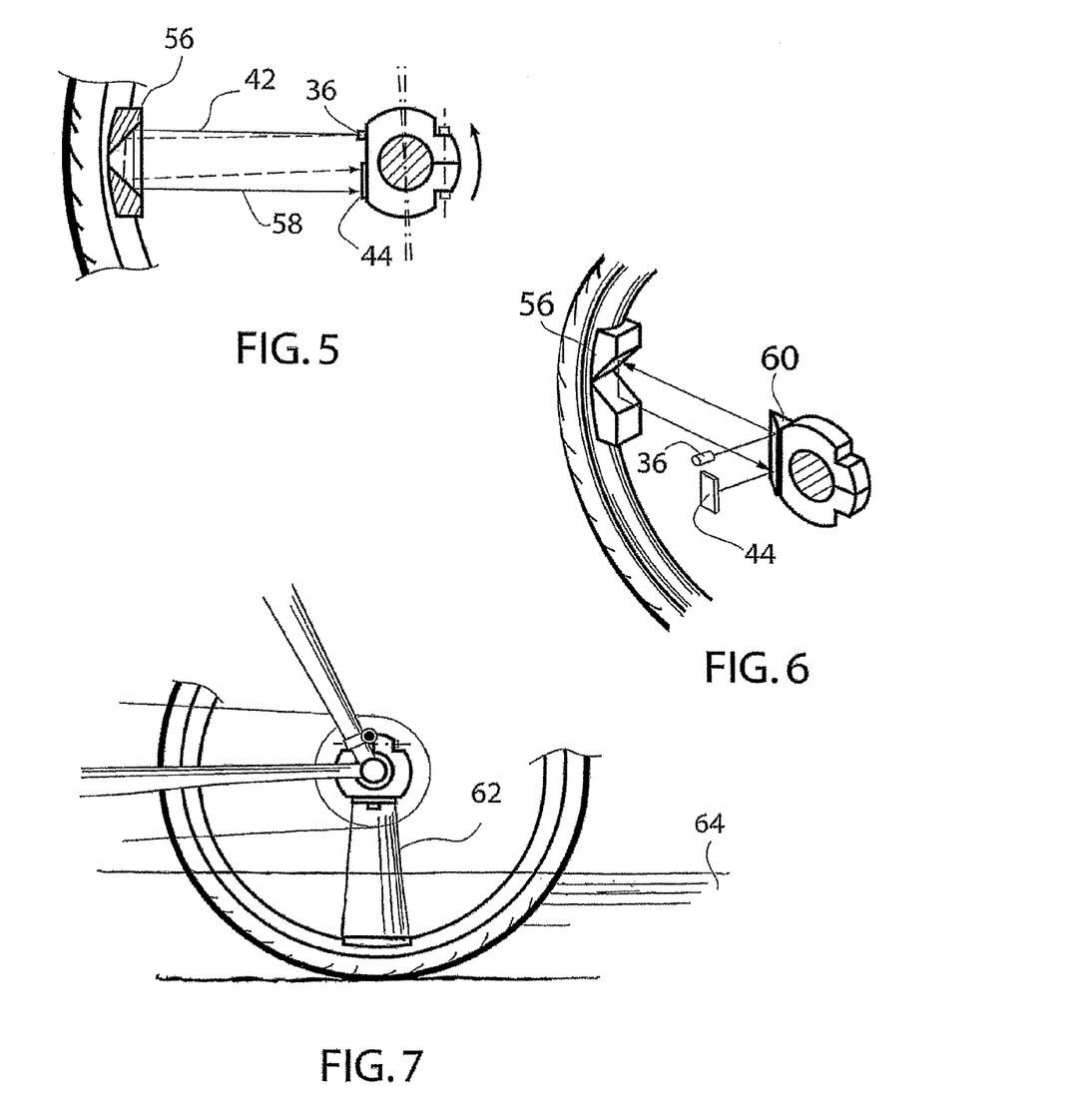
FIG. 5 is a fragmentary side view of a rear wheel and apparatus according to a further embodiment of the present invention, illustrating a reflective optical displacement system mounted to the hub and the rim.
FIG. 6 is a fragmentary perspective view of the rear wheel and apparatus according to a yet further embodiment of the present invention, illustrating reflective optical elements mounted on the hub and on the rim and a laser and a position sensitive detector mounted on the seat stay.
FIG. 7 is a side view of a rear wheel and apparatus according to a still further embodiment of the present invention, illustrating an optical displacement protected by a waterproof tube mounted between the hub and the rim.

As previously mentioned, the sensitivity of the power meter of present invention can be significantly improved by extending the travelling length of the laser beam R and as a result increasing the laser beam deflection $\Delta x_R$. FIG. 5 shows an alternative embodiment where the laser 36 and the position sensitive detector 44 are fixedly secured to the hub and an optical right-angle prism 56 attached to the rim. The prism, or any other well known in the prior art retro-reflecting device, is used in this arrangement to redirect the beam at 180 degrees and to send back a reflected beam 58. The signal generated on the detector in this arrangement is approximately doubled. It would be clear to one skilled in the art that the number of reflections can be increased by using more sophisticated optical systems. If the laser beam travels n time from the hub to the rim or back, the beam deflection is $\Delta x_{Rm} = (r+nR)\tan\theta$. This embodiment is of particular importance for power measurements performed on racing bikes, having usually enhanced stiffness of wheels or wheels produced from carbon fibres.

In an alternative embodiment, depicted in FIG. 6, the laser 36 and the position sensitive detector 44 are fixedly secured on the seat stay or the chain stay (not shown). A mirror 60 is fixedly secured on the hub and the prism is fixedly secured on the rim. In operation, the mirror redirects the beam emitted by the laser at 90 degrees from the incident direction to the prism. The prism, in turn, reflects the laser beam back to the mirror and to the detector. All electrically powered components in this embodiment are attached to fixed parts of a bicycle allowing very simple wiring. This arrangement reduces the system cost and can be recommended for budget power meters.

In bicycle motocross racing and cross-country touring the optical system of the power meter provided in the present invention can be affected by the mud and debris. An alternative embodiment illustrated in FIG. 7 is addressed to solving of this problem. A tube 62, produced from waterproof and elastic material, is installed between the hub 28 and the rim 32. The tube forms a channel suitable for the laser beam to pass through while it is protected from external mud 64.

From the description above, a number of advantages of some embodiments of the present invention become evident:
   (a) The power meter is universal, transferable and can be mounted easily and conveniently on a wide range of most common types of bicycles.
   (b) The power meter employs a contactless method.
   (c) The power meter is mounted on the bicycle rear wheel between the hub and the rim and measures an actual power output transmitted to the road.
   (d) The optical system of the power meter provides an outstanding level of accuracy and reliability in torque measurements.
   (e) The method can be used to monitor efficiency and adjustment of the bicycle transmission system.
   (f) The method can be used to monitor the stiffness and adjustment of the wheel.
   (g) The calibration procedure of the power meter is straightforward and can be performed in any workshop or by user.
   (h) The power meter can be produced from inexpensive components and materials.
   (i) The power meter is light, compact and can be installed on most advanced models of racing bikes.
   (j) The power meter can be installed on tandems to monitor the joined power produced by the riders.
   (k) The power meter does not include any moving or frictional parts and therefore provides extended durability.

It will be appreciated by those skilled in the art that modifications may be made to the invention herein described without departing from the scope thereof. For example, optical components of the power meter can be different, such as retro-reflectors, mirrors, prisms etc; components arrangement can be different; the laser can emit light in visible or non-visible portion of spectrum; the laser module can be replaced by any other electro-magnetic wave emitter; the angular velocity can be measured by a reed switch, Hall effect sensor, a magneto-resistive sensor etc; and the beam deflection can be measured by other sensing methods.

Thus the scope of the invention should be determined by the appended claims and their legal equivalents, and not by the examples given.

The invention claimed is:

1. An apparatus for monitoring torque transmitted by a driving wheel of a human powered vehicle, the human powered vehicle being a bicycle and the driving wheel being a bicycle wheel, said apparatus comprising one single electromagnetic emitter which is adapted to be fixed securely to a central region of said bicycle wheel for generating and directing a beam of electromagnetic radiation towards a rim of said bicycle wheel, and one single one-dimensional position sensitive detector mounted on said wheel for detecting a deflection of the beam when torque is applied to said bicycle wheel, the apparatus measuring a deflected distance of said beam and calculating torque from the deflected distance and a wheel torsion coefficient of the bicycle wheel and wherein said emitter and said detector rotate with the bicycle wheel and said beam travels at least a distance between said emitter at said central region and said rim of said bicycle wheel before detection.

2. An apparatus as claimed in claim 1 wherein the apparatus further comprises a magnetic sensor which is adapted to count rotations of said wheel, the rotations being used to monitor angular velocity.

3. An apparatus as claimed in claim 2 wherein the apparatus further comprises a microprocessor programmed to provide a power output based on the monitored parameters and calibration values.

4. An apparatus as claimed in claim 2 wherein said emitter generates a beam at intervals synchronised with the wheel rotation.

5. An apparatus as claimed in claim 1 wherein said emitter is fixed securely to a hub of said wheel and said detector is mounted on said rim.

6. An apparatus as claimed in claim 1 wherein a cylindrical lens is located at an input of said detector to focus said beam onto said detector.

7. An apparatus as claimed in claim 1 wherein the apparatus further comprises one or more optical elements to direct said beam towards said detector.

8. An apparatus as claimed in claim 7 wherein said optical element comprises a retro-reflector mounted on said rim, to reflect said beam to said detector mounted on said central region.

9. An apparatus as claimed in claim 7 wherein said optical elements comprise a mirror and a prism, wherein said emitter and said detector are located on a stay of said vehicle, said mirror being secured to said hub and said prism being secured to said rim.

10. An apparatus as claimed in claim 1 wherein the apparatus further comprises a tube, said tube being arranged between said emitter and said detector to contain said beam.

11. A method of monitoring torque transmitted by a driving wheel of a human powered vehicle, the human powered vehicle being a bicycle and the driving wheel being a bicycle wheel, comprising measuring an angle of twist of said bicycle wheel when torque is applied and wherein said angle is measured by detecting the deflection distance of a beam on a one single one-dimensional position sensitive detector produced by one single emitter fixed to a central region of said wheel, said beam travelling at least a distance between said emitter and a rim of said bicycle wheel before detection and said emitter and said detector rotating with the bicycle wheel, calculating torque from the angle and a wheel torsion coefficient of the bicycle wheel.

12. A method as claimed in claim 11 further comprising measuring a wheel torsion coefficient by fixing said rim in relation to said central region and applying a known torque to a sprocket of said wheel.

13. A method as claimed in claim 11 further comprising measuring an angular velocity of said wheel and calculating a power output.

\* \* \* \* \*